US011877691B2

(12) United States Patent
Altun

(10) Patent No.: US 11,877,691 B2
(45) Date of Patent: Jan. 23, 2024

(54) FULL AUTOMATIC DONER KEBAB CUTTING ROBOT

(71) Applicant: Korkmaz Mekatronik Endustri Makina Bilgisayar Yazilim San.VE Tic. Ltd. Sti., Torbali Izmir (TR)

(72) Inventor: Korkmaz Altun, Torbali Izmir (TR)

(73) Assignee: Korkmaz Mekatronik Sanayi Ve Ticaret Anonim Sirketi, Torbali Izmir (TR)

( * ) Notice: Subject to any disclaimer, the term of this patent is extended or adjusted under 35 U.S.C. 154(b) by 59 days.

(21) Appl. No.: 17/602,824

(22) PCT Filed: Apr. 13, 2019

(86) PCT No.: PCT/TR2019/050243
§ 371 (c)(1),
(2) Date: Oct. 11, 2021

(87) PCT Pub. No.: WO2020/214104
PCT Pub. Date: Oct. 22, 2020

(65) Prior Publication Data
US 2022/0039593 A1 Feb. 10, 2022

(51) Int. Cl.
A47J 37/04 (2006.01)
A47J 36/32 (2006.01)
A47J 37/07 (2006.01)

(52) U.S. Cl.
CPC .......... *A47J 37/043* (2013.01); *A47J 36/321* (2018.08); *A47J 37/0718* (2013.01)

(58) Field of Classification Search
CPC ..... A47J 36/321; A47J 37/0718; A47J 37/043
(Continued)

(56) References Cited

U.S. PATENT DOCUMENTS 2,072,677 A * 3/1937 Johnston ................ B26D 1/143
267/155
3,530,915 A * 9/1970 Sadanobu ............ B26D 7/0641
83/490
(Continued)

FOREIGN PATENT DOCUMENTS

WO 2009085022 A1 7/2009
WO 2013158056 A1 10/2013

OTHER PUBLICATIONS

Authorized Officer: Karanfil, Gokhan, International Search Report and the Written Opinion, International Patent Application No. PCT/TR2019/050243, dated Jan. 13, 2020, 7 pp.

*Primary Examiner* — Eric S Stapleton
(74) *Attorney, Agent, or Firm* — Chintan A. Desai; Offit Kurman, P.A.

(57) ABSTRACT

An automatic doner kebab cutting robot comprises; position sensors perceiving positions of the engine to introduce to the processor providing rotation movements of first engine providing vertical movement of cutting rod in second axis, a second engine providing horizontal movement of cutting rod in third axis, an engine providing movement of the knife of cutting rod in first axis, an engine providing rotation movement of doner kebab skewer in fourth axis, at least one scanner and/or laser perceiving starting point, height and diameter of doner kebab on it to introduce to the processor, at least 1 temperature sensor perceiving the value achieved by measuring temperature of doner kebab to introduce to the processor, a scanner and/or laser, control system (PLC/PIC) sending commands transferred by position sensors and temperature sensors and in this direction, to make furnace, doner kebab skewer, cutting rod and cutting knife it is connected to, move synchronously.

19 Claims, 3 Drawing Sheets

(58) Field of Classification Search
USPC .......................................................... 99/325
See application file for complete search history.

(56) References Cited

U.S. PATENT DOCUMENTS

| | | | | |
|---|---|---|---|---|
| 4,050,370 A * | 9/1977 | Schmidt | ............. | A22C 17/0033 99/594 |
| 5,357,853 A * | 10/1994 | Nelson | .................... | B26D 1/18 99/421 V |
| 6,587,739 B1 * | 7/2003 | Abrams | ................. | G05B 15/02 7/110 |
| 8,931,400 B1 * | 1/2015 | Allen | ...................... | A47J 36/00 99/344 |
| 2003/0127451 A1 * | 7/2003 | Lile | ......................... | A47J 37/06 219/506 |
| 2009/0183729 A1 * | 7/2009 | Barkhouse | ............. | G05D 23/22 126/39 BA |
| 2010/0034935 A1 * | 2/2010 | Wally | ...................... | A47J 37/00 426/232 |
| 2011/0276184 A1 * | 11/2011 | McKee | ................ | H05B 6/6485 219/681 |
| 2012/0074121 A1 * | 3/2012 | Gagas | .................... | H05B 3/0071 219/385 |
| 2013/0277353 A1 * | 10/2013 | Joseph | .................. | H05B 1/0263 219/209 |
| 2014/0121810 A1 * | 5/2014 | Jung | .................... | G06Q 10/087 700/115 |
| 2014/0121811 A1 * | 5/2014 | Jung | .................... | G06Q 10/087 700/115 |
| 2014/0122168 A1 * | 5/2014 | Jung | .................... | G06Q 10/083 705/7.29 |
| 2014/0122169 A1 * | 5/2014 | Jung | .................. | G06Q 30/0201 705/7.29 |
| 2014/0122184 A1 * | 5/2014 | Jung | ...................... | G01N 25/72 705/7.36 |
| 2014/0122260 A1 * | 5/2014 | Jung | ...................... | G06Q 50/12 705/15 |
| 2014/0122261 A1 * | 5/2014 | Jung | .................... | G06Q 10/083 705/15 |
| 2014/0122262 A1 * | 5/2014 | Jung | .................... | G06Q 10/087 705/15 |
| 2014/0122519 A1 * | 5/2014 | Jung | ...................... | G06Q 10/00 707/769 |
| 2014/0122520 A1 * | 5/2014 | Jung | .................... | G06F 16/248 707/769 |
| 2014/0311360 A1 * | 10/2014 | Bartelick | ............. | F24C 15/327 219/400 |
| 2015/0059595 A1 * | 3/2015 | Rand | .................... | F24C 15/2035 219/401 |
| 2015/0226481 A1 * | 8/2015 | Marchiori | ............... | F26B 23/04 392/416 |
| 2017/0095106 A1 * | 4/2017 | Cook | .................. | A47J 37/0713 |
| 2018/0127192 A1 * | 5/2018 | Cohen | .................... | G07F 13/06 |
| 2018/0224150 A1 * | 8/2018 | Lewis | .................... | F25D 29/003 |

* cited by examiner

FULL AUTOMATIC DONER KEBAB CUTTING ROBOT

TECHNICAL FIELD

The invention relates to a doner kebab cutting robot designed in order to automatically cook and cut doner kebab made from red or white meat in minor establishments such as restaurants, hotels in food sector.

PRIOR ART

Presentation of doner kebab with known technique is that the meat is inserted on a skewer and then it is cooked by rotation against the furnace and it is cut by human power by using long doner kebab knife. In this cutting method, the fact that the worker is always subject to high temperature decreases productivity of working. Sweating of the worker due to being exposed to high temperatures prevents that the doner kebab is presented to the customers under required hygienic conditions.

Cooking temperature should be at least 78 degrees in order that bacteria formation is eliminated in doner kebab and it should have a certain fineness and certain width to reach the taste desired. In the known technique, it is not possible to continuously cut the doner kebab reaching to high cooking temperature in the fineness and width desired by using long doner kebab cutting knife by the worker.

Doner kebab is started to be cut by electrically motorized doner kebab cutting knives after classic long doner kebab knives. Yet, achieving a standard fineness and width of doner kebab is impossible due to human factor also in this method. On the other hand, safety precautions taken for the user in terms of electrically motorized doner kebab cutting knives are insufficient.

Invention full automatic doner kebab cutting robots are configured to have internal heat shields and gas control system on the purpose of cooking doner kebab at the temperature desired in a homogenous way and providing energy saving. Cutting may be performed in desired temperature by the usage of heat sensors depending on the preferences of the customers. Knife sharpening may be performed in a safe way by turning on automatic sharpening mode by the help of touch screen.

The invention includes scanner and/or laser (optionally), position sensors (optionally) and control system having software (PLC/PIC), to which information coming from temperature sensors (optionally) is transferred and in this direction, which sends commands that furnace, doner kebab skewer, cutting rod and knife it is connected to are moving synchronously, touch screen, 1 step and 1 servo motor, step and servo motor drivers in full automatic doner kebab cutting robots.

In the known technique, radiant in the furnaces used in doner cutting robots are fired by switches located on the furnace. This action becomes difficult and poses a problem in terms of occupational safety depending on the location of the robot and condition of the place. The automatic controls of radiant and all furnace is provided by using optionally full automatic electric furnace system in some configurations of furnace on the purpose of eliminating this problem.

DESCRIPTION OF THE INVENTION

The purpose of the invention is to minimize manual control of doner kebab cutting on the purpose of making it appropriate for food health, doner kebab cutting standards and safety of the workers with a configuration including scanner and/or laser (optionally), position sensors (optionally) and special production (PLC/PIC) control system with software, to which information coming from temperature sensors (optionally) is transferred and in this direction, which sends commands that furnace, doner kebab skewer, cutting rod and knife it is connected to are moving synchronously. Another purpose of the invention is to provide performing cutting in standards desired with temperature sensors.

DESCRIPTION OF REFERENCE NUMBERS

Figure 1:
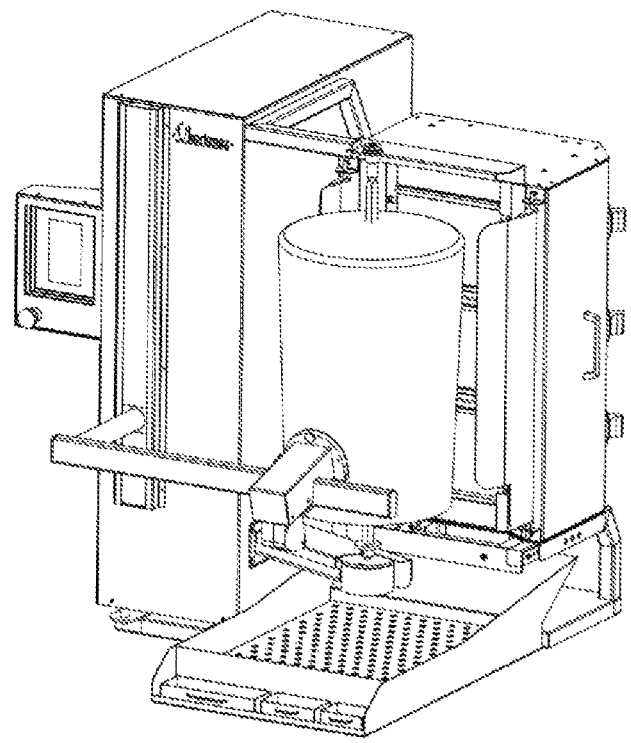
FIG. 1: Front perspective image of doner kebab cutting robot
Figure 2:
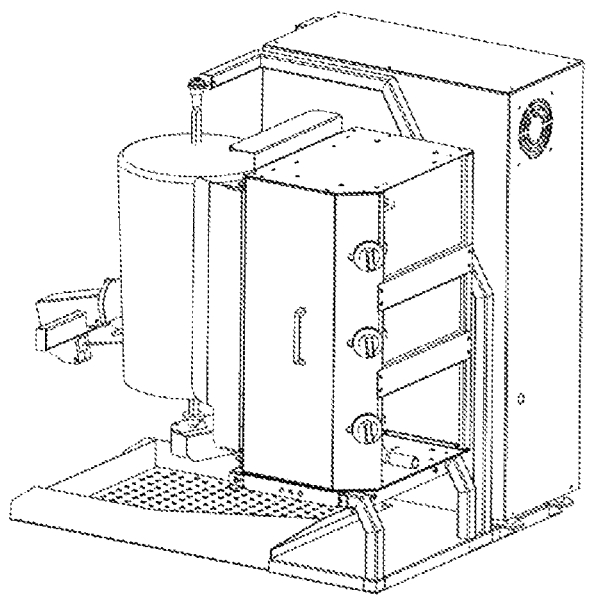
FIG. 2: Rear perspective image of doner kebab cutting robot
Figure 3:
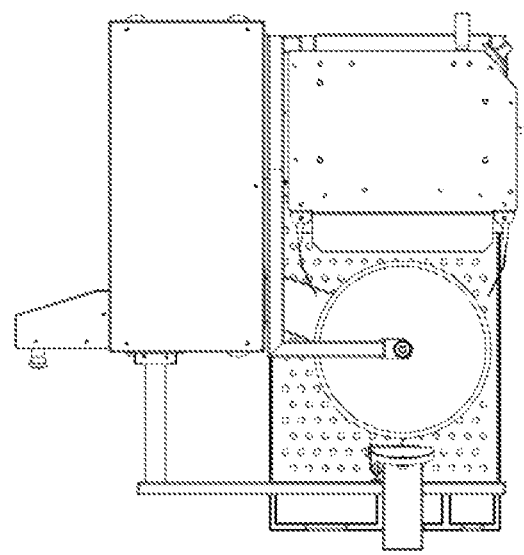
FIG. 3: Upper part image of doner kebab cutting robot
Figure 4:
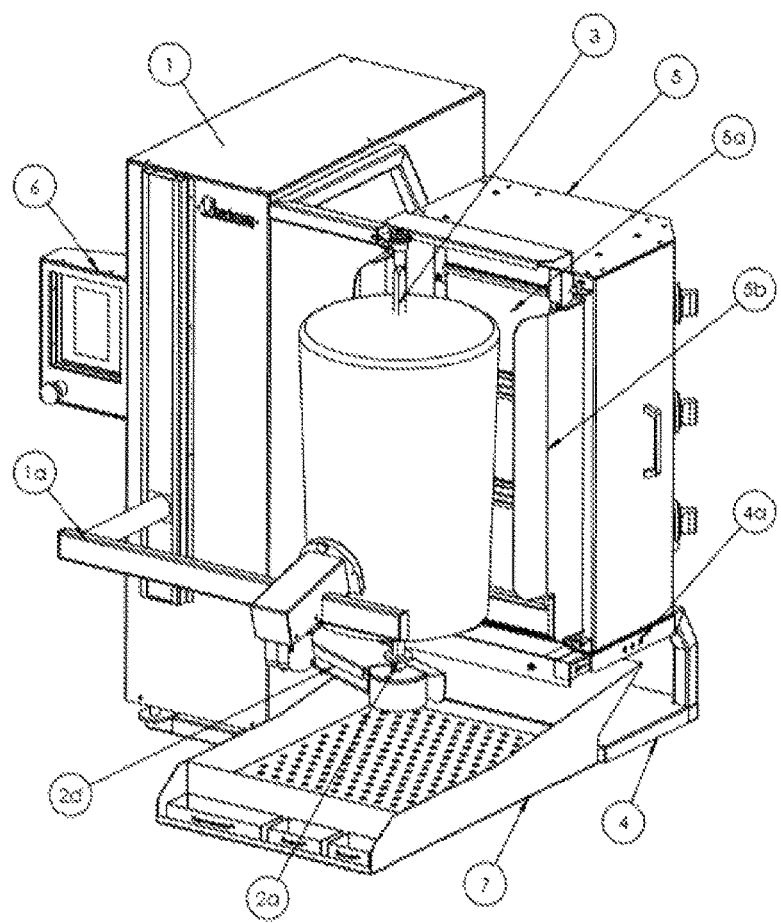
FIG. 4: General image of doner kebab cutting robot
Figure 5:
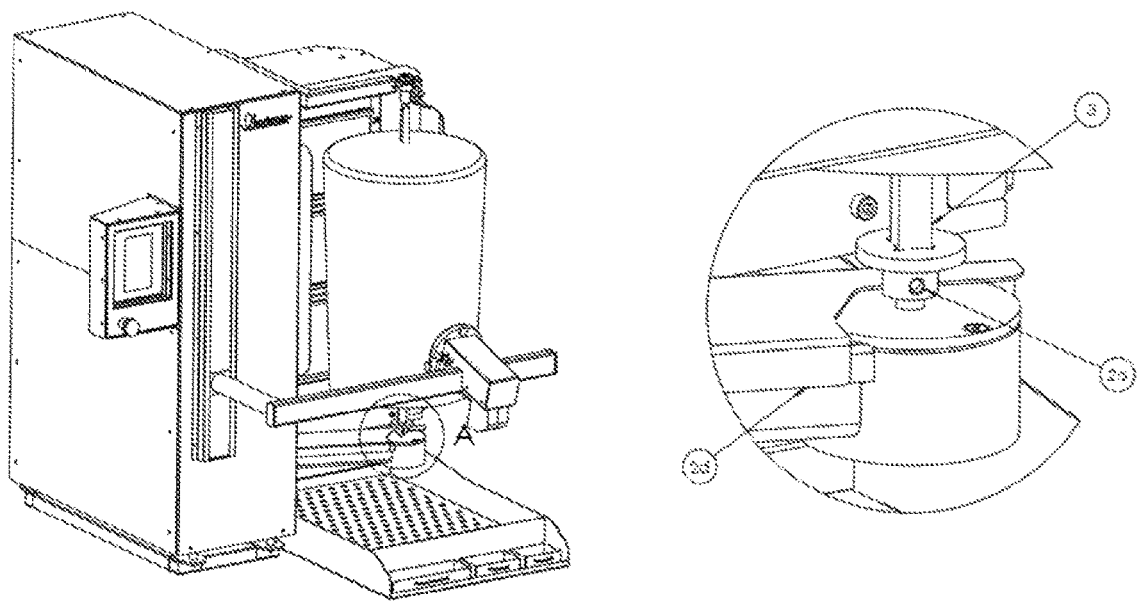
FIG. 5: Detail image of doner kebab cutting robot rotation mechanism
Figure 6:
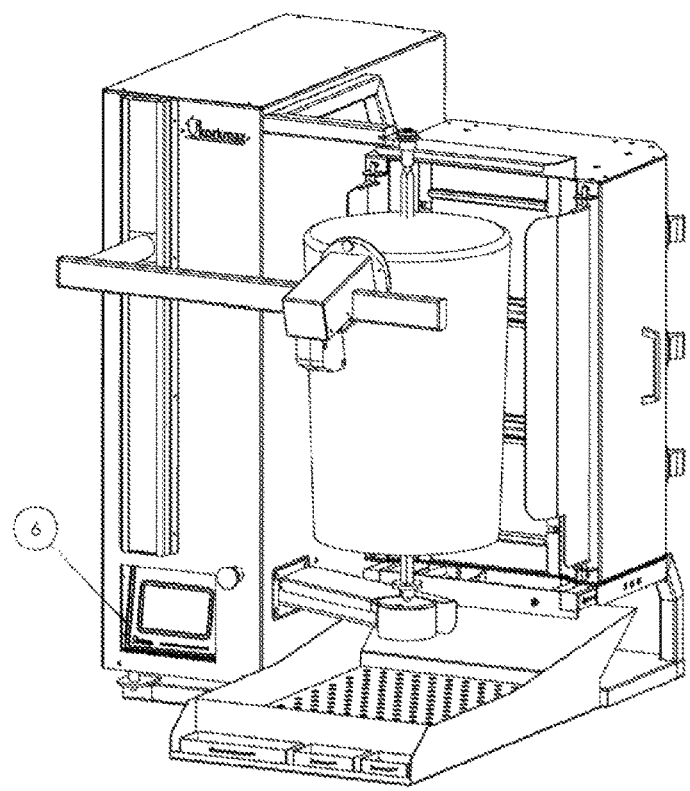
FIG. 6: Image of front position of doner kebab cutting robot touch screen
Figure 7:
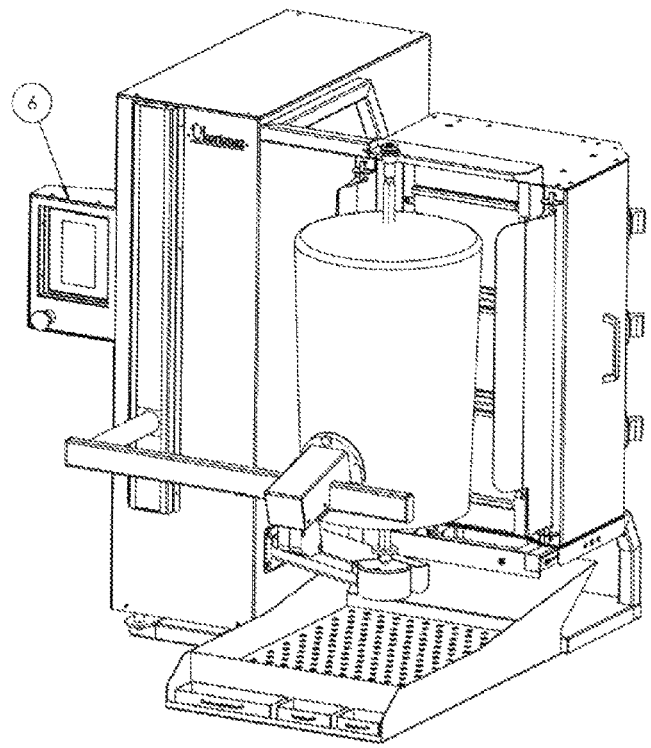
FIG. 7: Image of side position of doner kebab cutting robot touch screen

1. Frame group
   1a. First axis (Cutting rod and cutting knife connected)
   1b. Second axis (Vertical axis)
   1c. Third axis (Horizontal axis)
   1d. Rotation engine
   1e. Rotation engine shrinking mechanism
   1f. Electric panel
2. Rotation mechanism
   2a. Doner kebab skewer fixer part
   2b. Timing belt
   2c. Doner kebab skewer
   2d. Sheet metal sections
3. Doner kebab skewer
4. Chassis group
   4a. Furnace movement mechanism
5. Furnace
   5a. Radiant
   5b. Heat shields
6. Touch screen
7. Tray Group Doner kebab robot has movement mechanisms in four different axes. First axis (1a) provides rotation movement of cutting knife connected to cutting rod in doner kebab cutting head. Rotating knife provides that doner kebab is sensitively cut. Second axis (1b) provides movement of cutting rod in vertical direction. Third axis (1c) provides movement of cutting rod in horizontal direction. Fourth axis (2) provides that doner kebab skewer rotates with rotation mechanism. Electric panel contains carcass, in which sections providing movement of horizontal and vertical axes are included, and a part of rotation mechanism, which is the fourth axis. Rotation mechanism (2) consists of rotation engine (1d) included within carcass (1) and engine shrinking mechanism (1e), gear and timing belt providing transfer of physical movements between engine and doner kebab skewer (2c), sheet metal sections (2d), which provide connection between engine and doner kebab skewer fixing part (2a) and in which timing belt (2b) passes through. Positions of the engines, diameter and height of doner kebab may continuously be read by the help of scanner and/or laser (optionally) and position sensors (optionally). Mentioned four position sensors (optionally) and while providing doner kebab cutting, they allow software changing of doner kebab cutting beam width, doner kebab cutting thickness and cutting speed. Hence, user company may cut the doner kebab in different measurements over touch screen (6) according to the presentation it will make. Touch screen may optionally be positioned in three different forms. Options, in which touch screen is in the side, front and hand terminal, are presented for the purchasers' tastes. Laser sensor, which is installed optionally and measures diameter and height of doner kebab, should be positioned below cutting rod and special design aluminum body consisting of two parts is protected from negative effects such as high temperature, oil and water.

Furnace provides the movement of getting closer and away from doner kebab by linear operating ball-bearings and 12 mm diameter shafts. Hence, distance of furnace to doner kebab is adjusted and sensitive cooking is performed. By means of adjusted heat shields configured on the furnace, equal heat distribution and energy saving are provided. Furnace is designed as a block consisting of three radiant, it has two different types as electric and gaseous (NG-LPG).

Invention full automatic doner kebab robot cutting capacity is max. 25 kg. Doner kebab meat diameter is max. 28 cm and doner kebab meat height is 45 cm. Cutting rod is two types as right and left and cutting diameter may be adjusted to be max. 10 degrees.

Fuse time limit relay, contactor, emergent stop cork equipment and electric safety are provided in electric panel placed within carcass (1). Mechanical equipment of the robot is manufactured by using sheet metal from chrome AISI 304 quality material and profiles from chrome materials in different measurements.

Doner kebab cutting robot control is performed by special design (PLC/PIC) control system and touch screen (6). It is appropriate for control with remote controller, remote access by computer and Android® devices.

DETAILED DESCRIPTION OF INVENTION

Doner kebab robot has movement mechanism in four different axes. First axis (1a) provides rotation movement of cutting knife connected to cutting rod in doner kebab cutting head. Rotating knife provides cutting of doner kebab sensitively. Second axis (1b) provides vertical movement of cutting rod. Third axis (1c) provides horizontal movement of cutting rod. Fourth axis (2) is a rotating mechanism and provides doner kebab skewer to rotate. Electric panel contains carcass, in which sections providing movement of horizontal and vertical axes are included, and a part of rotation mechanism, which is the fourth axis. Rotation mechanism consists of rotation engine (1d) included within carcass and engine shrinking mechanism (1e), gear and timing belt (2b) providing transfer of physical movements between engine (1d) and doner kebab skewer (3), sheet metal sections (2d), which provide connection between engine (1d) and doner kebab skewer fixing part (2a) and in which timing belt passes through.

Positions of the engines, diameter and height of doner kebab may continuously be read by the help of scanner and/or laser (optionally) and position sensors (optionally). Mentioned four axes move synchronously by using information received from laser (optionally) and position sensors (optionally) and while providing doner kebab cutting, they allow software changing of doner kebab cutting beam width, doner kebab cutting thickness and cutting speed. Hence, user company may cut the doner kebab in different measurements over touch screen (6) according to the presentation it will make. Touch screen may optionally be positioned in three different forms. Options, in which touch screen is in the side, front and hand terminal, are presented for the purchasers' tastes. Laser sensor, which is installed optionally and measures diameter and height of doner kebab, should be positioned below cutting rod (1a) and special design aluminum body consisting of two parts is protected from negative effects such as high temperature, oil and water.

Full automatic doner kebab robot is designed in four parts as carcass group (1), chassis group (4), furnace group (5) and tray group (7) by taking into consideration usage and carriage easiness. Vertical (1b) and horizontal (1c) axes, touch screen (6), electric panel (1f), engines (1d), drivers, (PLC/PIC) control system are included within carcass group (1). All mechanic sections are protected within carcass (1) and carriage, technical service and cleaning facility are provided. Furnace movement mechanism (4a), doner kebab skewer fixer part (2a) are included within chassis group. Furnace (5) and adjustable heat shields (5b) are included within furnace group. Two parts of trays are included in tray group. Invention full automatic doner kebab cutting robot consists of 4 different groups as carcass group (1), furnace group (5), chassis group (4) and tray group (7). 3 groups except for tray group may not be disassembled.

Furnace (5) provides the movement of getting closer and away from doner kebab by linear operating ball-bearings and 12 mm diameter shafts. Hence, distance of furnace (5) to doner kebab is adjusted and sensitive cooking is performed. By means of adjusted heat shields (5b) configured on the furnace, equal heat distribution and energy saving are provided. Furnace (5) is designed as a block consisting of three radiant, it has two different types as electric and gaseous (NG-LPG).

Invention full automatic doner kebab robot cutting capacity is max. 25 kg. Doner kebab meat diameter is max. 28 cm and doner kebab meat height is 45 cm. Cutting rod is two types as right and left and cutting diameter may be adjusted to be max. 10 degrees.

Width, length and height measurements of full automatic doner kebab cutting robot are designed in an optimum way by taking in consideration narrow working areas. Weight of robot is kept at minimum by taking into account the carriage and usage easiness. It is kept away from negative impacts such as oil and high temperatures since doner kebab rotation engine (1d) is included in carcass group (1). Working area is increased by means of mentioned design and easiness is provided in terms of cleaning and technical maintenance. Blower manufactured from plastic material durable to high temperature is placed in the connection between cutting rod and carcass and leakage of water and oil into the carcass is prevented and an aesthetic appearance is gained by the robot.

Fuse time limit relay, contactor, emergent stop cork equipment and electric safety are provided in electric panel (1f) placed within carcass (1). Mechanic sections of robot are manufactured from sheet metal from chrome AISI 304 quality material and profiles in different measurements.

Invention doner kebab cutting robot control is performed by special design (PLC/PIC) control system and touch screen (6). It is appropriate for control with remote controller, remote access by computer and Android® devices.

The invention claimed is:

1. An automatic doner kebab cutting robot comprising:
a first engine providing rotational movement of a cutting rod and a cutting knife along a first axis;
a second engine providing vertical movement of the cutting rod along a second axis;
a third engine providing horizontal movement of the cutting rod along a third axis;
a fourth engine providing rotational movement of a doner kebab skewer along a fourth axis;
a plurality of position sensors configured to identify a position of the first engine, second engine, third engine and fourth engine;
at least one of a scanner or laser configured to identify a starting point, height and diameter of a doner kebab on the doner kebab skewer;
at least one temperature sensor configured to measure a temperature of the doner kebab; and
a control system (PLC/PIC) configured to receive and process information from the plurality of position sensors, the at least one of a scanner or laser, and the at least one temperature sensor;
wherein the control system (PLC/PIC) sends a plurality of commands based on the information received, and causes a furnace, the doner kebab skewer, the cutting rod and the cutting knife to move synchronously.

2. An automatic doner kebab cutting robot according to claim 1, wherein the control system (PLC/PIC) is remotely accessible by a remote controller or computer device, the control system (PLC/PIC) including a touch screen configured to allow control of the control system (PLC/PIC) and present options based on the tastes of a purchaser, and wherein the touch screen may be adjustably positioned along the automatic doner kebab cutting robot.

3. An automatic doner kebab cutting robot according to claim 1, further comprising an electric panel positioned within a housing of the automatic doner kebab cutting robot, the electric panel providing a fuse, a time limit relay, a contactor, an emergent stop cork equipment and electric safety.

4. An automatic doner kebab cutting robot according to claim 1, further comprising a rotation mechanism providing rotational movement around an axis by a rotational engine.

5. An automatic doner kebab cutting robot according to claim 1, further comprising a plurality of sheet metal sections and a timing belt connected to the fourth engine and the doner kebab skewer, wherein the timing belt passes through the plurality of sheet metal sections and conveys rotational movement from the fourth engine to the doner kebab skewer.

6. An automatic doner kebab cutting robot according to claim 1, comprising four groups such as a carcass group, furnace group, chassis group and a demountable tray group.

7. An automatic doner kebab cutting robot according to claim 1, further comprising a furnace having a plurality of radiant blocks adjustably activated by the control system (PLC/PIC), wherein the control system (PLC/PIC) includes a processor with software including interfaces configured to turn the radiant blocks on and off via the touch screen controlling the processor.

8. An automatic doner kebab cutting robot comprising:
a cutting rod;
a cutting knife connected to the cutting rod;
a housing, the housing containing:
a first engine providing rotational movement of the cutting rod along a first axis, wherein rotational movement of the cutting rod causes movement of the cutting knife,
a second engine providing vertical movement of the cutting rod along a second axis,
a third engine providing horizontal movement of the cutting rod along a third axis,
a fourth engine providing rotational movement of a doner kebab skewer along a fourth axis, and
a control system operatively connected to the first engine, the second engine, the third engine and the fourth engine;
a plurality of position sensors operatively connected to the control system and configured to identify a position of the first engine, second engine, third engine, and fourth engine;
at least one of a scanner or laser operatively connected to the control system and configured to identify a starting point, height and diameter of a doner kebab placed on the automatic doner kebab cutting robot; and
at least one temperature sensor operatively connected to the control system and configured to measure a temperature of the doner kebab;
wherein the control system is configured to send a plurality of commands to the first engine, second engine, third engine and fourth engine based on information received from the plurality of position sensors and the at least one temperature sensor.

9. The automatic doner kebab cutting robot of claim 8, wherein the plurality of commands cause movement of the doner kebab skewer, the cutting rod, the cutting knife and a furnace.

10. The automatic doner kebab cutting robot of claim 8, wherein a portion of the fourth engine extends outside of the housing.

11. The automatic doner kebab cutting robot of claim 8, wherein the control system is configured to be remotely controlled by a computer or mobile device.

12. The automatic doner kebab cutting robot of claim 8, wherein the control system includes a touch screen configured to allow a user to control the automatic doner kebab cutting robot based on a plurality of predetermined user preferences.

13. The automatic doner kebab cutting robot of claim 12, wherein the touch screen is adjustably positioned along the exterior of the housing of the automatic doner kebab cutting robot.

14. The automatic doner kebab cutting robot of claim 8, wherein the housing further includes an electric panel having at least one of a fuse, time limit relay, contactor, emergent stop cork equipment, or electric safety elements.

15. The automatic doner kebab cutting robot of claim 8, further comprising a rotation mechanism for rotating the doner kebab skewer, the rotation mechanism including:
the fourth engine;
the doner kebab skewer;
a plurality of sheet metal segments connecting the fourth engine and the doner kebab skewer; and
a timing belt passing through the plurality of sheet metal segments and connected to the fourth engine and the doner kebab skewer, wherein the timing belt is configured to convey rotational movement from the fourth engine to the doner kebab skewer.

16. The automatic doner kebab cutting robot of claim 8, further comprising a furnace having a plurality of radiant blocks, wherein each of the plurality of radiant blocks are adjustably activated by the control system.

17. The automatic doner kebab cutting robot of claim 16, wherein the furnace is adjustably spaced from the doner kebab skewer based on user preference.

18. The automatic doner kebab cutting robot of claim 16, wherein the furnace includes a plurality of adjustable heat shields.

19. The automatic doner kebab cutting robot of claim 8, wherein the control system includes software for adjusting a cutting beam width, cutting thickness or cutting speed of the automatic doner kebab cutting robot during operation.

\* \* \* \* \*